Patented June 22, 1937

2,084,928

UNITED STATES PATENT OFFICE 2,084,928

SILVER SOLDER

Harold Turner, Sheffield, England, assignor to Johnson Matthey & Company Limited, London, England, a British company No Drawing. Application January 29, 1935, Serial No. 3,954. In Great Britain January 30, 1934

6 Claims. (Cl. 75—173)

This invention relates to the manufacture and production of silver solders and especially of those for use in joining rustless or stainless iron or steel alloys, such as the steel known under registered trade mark as "Staybrite".

The solders hitherto used for joining such stainless iron or steel alloys are yellowish in colour and result in unsightly joints; this is of great disadvantage, for example when the solders are used for joining shop-fronts and fittings or hollow ware.

The object of the present invention is to provide a solder, especially intended for use in joining stainless iron or steel alloys, which is of a colour similar to that of the stainless iron or steel alloy to be soldered and is much stronger than the solders hitherto used for the purpose.

According to this invention a silver solder of the said kind is produced by alloying silver with manganese and copper, if desired with the addition of small amounts of other elements.

I prefer to use alloys comprising from 15 to 70 per cent of silver, from 10 to 20 per cent of manganese and from 20 to 60 per cent of copper.

In some cases it is desirable to add small amounts of elements which act as deoxidizing agents, such as aluminium, silicon or phosphorus, but the amount added should not exceed about 1 per cent.

I have found that excellent results are obtained with solders consisting of 43 per cent of silver, 20 per cent of manganese and 37 per cent of copper, or of 60 per cent of silver, 10 per cent of manganese and 30 per cent of copper. The properties of these solders may be seen from the table below (see Nos. 4 and 9).

The solders are of substantially the same colour as the stainless iron or steel alloys and since they are highly resistant to corrosion they remain the same colour practically indefinitely. They may therefore be used with great advantage for joining shop-fronts or fittings or hollow ware of rustless or stainless iron or steel alloys because the joints are inconspicuous and substantially non-tarnishable.

In order to obtain a good white colour, the percentage of silver and manganese together should be at least about 30 per cent and the manganese content should be at least 10 per cent when the silver content is less than 45 per cent.

A further advantage of the solders according to this invention is that they run freely when used with a suitable flux. I prefer to use a flux consisting of a mixture of boric acid or an alkali metal borate with an alkali metal fluoride, for example a mixture of 60 per cent of powdered borax glass and 40 per cent of potassium fluoride.

The solders "wet" the iron or steel alloys to be soldered more readily than ordinary silver solders and yield much stronger joints. They are therefore to be recommended for soldering the blades of turbines and for other purposes where great strength is required or where it is necessary for the solder to run into narrow openings.

The alloys may be prepared in the usual manner by melting the silver and copper in a plumbago crucible under a cover of charcoal and then adding the manganese a little at a time while stirring. Before casting, I may add a small proportion of phosphor-copper, for example 0.5 per cent containing 15 per cent of phosphorus, in order completely to deoxidize the alloy and to improve its running properties. Aluminium or silicon may also be used instead of phosphorus.

A number of suitable compositions for alloys according to this invention is given in the table below together with their melting range (Part I) and their tensile properties (Part II), the latter being determined by means of the Hounsfield "Tensometer". The invention is not, however, restricted to the particular examples given in the table.

Table—Part I

| Alloy No. | Percentage composition | | | Melting range in ° centigrade | |
|---|---|---|---|---|---|
| | Silver | Manganese | Copper | Liquidus | Solidus |
| 1 | 20 | 20 | 60 | 833 | 744 |
| 2 | 25 | 20 | 55 | 809 | 743 |
| 3 | 30 | 20 | 50 | 785 | 745 |
| 4 | 43 | 20 | 37 | 754 | 745 |
| 5 | 45 | 15 | 40 | 760 | 749 |
| 6 | 45 | 20 | 35 | 755 | 745 |
| 7 | 50 | 15 | 35 | 754 | 743 |
| 8 | 60 | 15 | 25 | 803 | 745 |
| 9 | 60 | 10 | 30 | 779 | 757 |
| 10 | 65 | 10 | 25 | 796 | 747 |
| 11 | 65 | 15 | 20 | 822 | 745 |
| 12 | 70 | 10 | 20 | 825 | 749 |

Table—Part II

| Alloy No. | Tensile properties | | | | |
|---|---|---|---|---|---|
| | Brinell hardness | Reduction in area per cent | Elongation per cent | Yield point tons per square inch | Ultimate stress tons per square inch |
| 1 | 137 | 35 | 27.5 | 28 | 36 |
| 2 | 137 | 33.5 | 25 | 30.5 | 37.5 |
| 3 | 143 | 33 | 27 | 32.5 | 38 |
| 4 | 156 | 20 | 20 | 34 | 37.5 |
| 5 | 137 | 39 | 27 | 27 | 31.5 |
| 6 | 156 | 17 | 17 | 27 | 35.5 |
| 7 | 131 | 23 | 21 | 31 | 32.5 |
| 8 | 143 | 31 | 25 | 26 | 30.5 |
| 9 | 111 | 32 | 22 | 24 | 29 |
| 10 | 126 | 30 | 29 | 23.5 | 27.5 |
| 11 | 126 | 26.5 | 30 | 27 | 31.5 |
| 12 | 111 | 41 | 34 | 21.5 | 27 |

What I claim is:—

1. A silver-containing solder for joining rustless or stainless iron or steel alloys and having a solidus below the melting point of the copper-silver eutectic (778° C.) consisting of from 15 to 70 per cent of silver, from 5 to 20 per cent of manganese and from 20 to 65 per cent of copper.

2. A silver-containing solder for joining rustless or stainless iron or steel alloys having a solidus below the melting point of the copper-silver eutectic (778° C.) consisting of from 10 to 20 per cent of manganese, from 15 to 45 per cent of silver and the remainder copper.

3. A silver solder for joining rustless or stainless iron or steel alloys having a solidus below the melting point of the copper-silver eutectic (778° C.) consisting of 43 per cent of silver, 20 per cent of manganese and 37 per cent of copper.

4. A silver solder for joining rustless or stainless iron or steel alloys having a solidus below the melting point of the copper-silver eutectic (778° C.) consisting of 60 per cent of silver, 10 per cent of manganese and 30 per cent of copper.

5. A silver-containing solder for joining rustless or stainless iron or steel alloys, consisting of 65 per cent silver, 15 per cent manganese and 20 per cent copper.

6. A silver-containing solder for joining rustless or stainless iron or steel alloys having a solidus below the melting point of the copper-silver eutectic (778° C.) consisting of from 15% to 70% of silver, from 5% to 20% of manganese and from 20% to 65% of copper, said solder being characterized by having the percentage of silver and manganese together at least 30%, and the manganese at least 10%, when the silver contained is less than 45%.

HAROLD TURNER.

Certificate of Correction

Patent No. 2,084,928.   June 22, 1937.

HAROLD TURNER

It is hereby certified that errors appear in the printed specification of the above numbered patent requiring correction as follows: Page 1, first column, lines 22 to 24, strike out the paragraph beginning with the words "I prefer" and insert instead the following paragraph:

*I prefer to use alloys comprising from 4 to 80 per cent of silver, from 1 to 40 per cent of manganese and from 10 to 70 per cent of copper. The best alloys within this range are those containing from 15 to 70 per cent of silver, from 5 to 20 per cent of manganese and from 20 to 60 per cent of copper.;* line 36, for "4 and 9" read *5 and 10*; and second column, strike out lines 25 to 60 inclusive, comprising the table, Part I and Part II, and insert instead the following:

Table—Part I

| Alloy No. | Percentage composition | | | Melting range in ° centigrade | |
|---|---|---|---|---|---|
| | Silver | Manganese | Copper | Liquid | Solidus |
| 1 | 15 | 20 | 65 | 860 | 797 |
| 2 | 20 | 20 | 60 | 833 | 744 |
| 3 | 25 | 20 | 55 | 809 | 743 |
| 4 | 30 | 20 | 50 | 785 | 745 |
| 5 | 43 | 20 | 37 | 754 | 745 |
| 6 | 45 | 15 | 40 | 760 | 749 |
| 7 | 45 | 20 | 35 | 755 | 745 |
| 8 | 50 | 15 | 35 | 754 | 743 |
| 9 | 60 | 15 | 25 | 803 | 745 |
| 10 | 60 | 10 | 30 | 779 | 757 |
| 11 | 65 | 10 | 25 | 796 | 747 |
| 12 | 65 | 15 | 20 | 822 | 745 |
| 13 | 70 | 5 | 25 | 791 | 757 |
| 14 | 70 | 10 | 20 | 825 | 749 |

Table—Part II

| Alloy No. | Tensile properties | | | | |
|---|---|---|---|---|---|
| | Brinell hardness | Reduction in area per cent | Elongation per cent | Yield point tons per square inch | Ultimate stress tons per square inch |
| 1 | 126 | 30 | 25 | 30.5 | 38.5 |
| 2 | 137 | 35 | 27.5 | 28 | 36 |
| 3 | 137 | 33.5 | 25 | 30.5 | 37.5 |
| 4 | 143 | 33 | 27 | 32.5 | 38 |
| 5 | 156 | 20 | 20 | 34 | 37.5 |
| 6 | 137 | 39 | 27 | 27 | 31.5 |
| 7 | 156 | 17 | 17 | 27 | 35.5 |
| 8 | 131 | 23 | 21 | 31 | 32.5 |
| 9 | 143 | 31 | 25 | 26 | 30.5 |
| 10 | 111 | 32 | 22 | 24 | 29 |
| 11 | 126 | 30 | 29 | 23.5 | 27.5 |
| 12 | 126 | 26.5 | 30 | 27 | 31.5 |
| 13 | 111 | 46.5 | 39 | 19 | 24 |
| 14 | 111 | 41 | 34 | 21.5 | 27 | page 2, first column, line 12, claim 2, for the numeral "45" read *70*; line 13, same claim, for "the remainder copper" read *from 20 to 60 per cent of copper*;
and that the said Letters Patent should be read with these corrections therein that the same may conform to the record of the case in the Patent Office.

Signed and sealed this 17th day of August, A. D. 1937.

[SEAL]

LESLIE FRAZER,
*Acting Commissioner of Patents.*